US011978953B2

(12) United States Patent
Kim et al.

(10) Patent No.: US 11,978,953 B2
(45) Date of Patent: May 7, 2024

(54) WIRELESS COMMUNICATION DEVICE

(71) Applicant: KMW INC., Hwaseong-si (KR)

(72) Inventors: Yoon Yong Kim, Hwaseong-si (KR); Inho Kim, Hwaseong-si (KR); Seong-man Kang, Hwaseong-si (KR); Jin Soo Yeo, Hwaseong-si (KR); Dae-Myung Park, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 180 days.

(21) Appl. No.: 17/389,357

(22) Filed: Jul. 30, 2021

(65) Prior Publication Data

US 2021/0359402 A1 Nov. 18, 2021

Related U.S. Application Data

(63) Continuation of application No. PCT/KR2020/000885, filed on Jan. 17, 2020.

(30) Foreign Application Priority Data

Feb. 1, 2019 (KR) ........................ 10-2019-0013406

(51) Int. Cl.
*H01Q 1/42* (2006.01)

(52) U.S. Cl.
CPC .................................... *H01Q 1/42* (2013.01)

(58) Field of Classification Search
CPC ........................................................ H01Q 1/42
USPC .......................................................... 343/872
See application file for complete search history.

(56) References Cited

U.S. PATENT DOCUMENTS

| | | | | |
|---|---|---|---|---|
| 2017/0271767 | A1 | 9/2017 | Nair et al. | |
| 2019/0033546 | A1* | 1/2019 | Bandy | G02B 6/4454 |
| 2019/0081391 | A1* | 3/2019 | Yasin | G03B 29/00 |

FOREIGN PATENT DOCUMENTS

| | | | |
|---|---|---|---|
| DE | 3840383 | A1 | 6/1989 |
| JP | S58-177004 | A | 10/1983 |
| JP | S61-093008 | U | 6/1986 |
| JP | H04-027606 | U | 3/1992 |
| JP | 04-114210 | U | 10/1992 |
| JP | 05-030781 | U | 4/1993 |
| JP | H05-030781 | U | 4/1993 |
| JP | 2002-051138 | A | 2/2002 |
| JP | 2009-152744 | A | 7/2009 |
| KR | 20-1997-0007260 | U | 2/1997 |

(Continued)

OTHER PUBLICATIONS

International Search Report for PCT/KR2020/000885 dated Apr. 29, 2020 and its English translation.

(Continued)

*Primary Examiner* — Peguy Jean Pierre
(74) *Attorney, Agent, or Firm* — Insight Law Group, PLLC; Seung Lee

(57) ABSTRACT

The present disclosure in at least one embodiment provides a wireless communication device, comprising a radome comprising a first locking unit and a sealing protrusion formed along at least one side end, a lower case formed along at least one side end and including a sealing protrusion groove which is configured to receive at least part of the sealing protrusion and a second locking unit, and a fastener which is fastened to the first locking unit and the second locking unit to fix the lower case and the radome.

13 Claims, 8 Drawing Sheets

(56) References Cited

FOREIGN PATENT DOCUMENTS

| | | | |
|---|---|---|---|
| KR | 10-2013-0066918 | A | 6/2013 |
| WO | 2013/033894 | A1 | 3/2013 |
| WO | 2015-037771 | A1 | 3/2015 |

OTHER PUBLICATIONS

Indian office action dated Mar. 16, 2022 for Indian Application No. 202117039220.
Extended search report dated Sep. 26, 2022 for European Application No. 20749397.4.
Non-final office action dated Jul. 26, 2022 for Japanese Application No. 2021-544425 and its English translation.

* cited by examiner

WIRELESS COMMUNICATION DEVICE

CROSS-REFERENCE TO RELATED APPLICATIONS

This application is a continuation of International Application No. PCT/KR2020/000388, filed on Jan. 9, 2020, which priority from, Korean Patent Application Number 10-2019-0013406, filed Feb. 1, 2019, the disclosure of which are incorporated by reference herein in their entirety.

TECHNICAL FIELD

The present disclosure relates to a wireless communication device.

BACKGROUND

The statements in this section merely provide background information related to the present disclosure and do not necessarily constitute prior art.

A wireless communication device has electrical components disposed within the device, thereby performing wireless communication functions.

In many cases, the wireless communication device is exposed to an outdoor environment, as it is on a rooftop of a building, for transmitting and receiving smooth wireless signals. It is therefore important to protect the electrical components inside the device from external foreign substances, in particular water or moisture.

The prior art places a radome and a lower case adjacent to each other on top, and then performs bolting coupling.

FIG. 1 is a front perspective view of a radome with conventional bolting coupling. Referring to FIG. 1, there may be play in a bolting hole (not shown) formed in a radome 1 of a bolting coupled wireless communication device. Therefore, rainwater or the like may penetrate into the interior of the apparatus.

In addition, there is a concern that deformation may occur in a radome 1 due to excessive tightening when an operator performs the bolting.

In addition, there is a problem that the assembling process of the wireless communication device is cumbersome because the operator directly bolts a plurality of bolts 2.

In addition, the radome 1 made of a bolting connection comprises a bolting area for the bolting. As a result, the area occupied by the bolting area reduces the area in which the electrical component can be placed in the radome 1. Therefore, there is a problem that space utilization is poor and the weight of the wireless communication device unnecessarily increases.

SUMMARY

The present disclosure in at least one embodiment provides a wireless communication device, comprising a radome comprising a first locking unit and a sealing protrusion formed along at least one side end, a lower case formed along at least one side end and including a sealing protrusion groove which is configured to receive at least part of the sealing protrusion and a second locking unit, and a fastener which is fastened to the first locking unit and the second locking unit to fix the lower case and the radome.

REFERENCE NUMERALS

Figure 1:
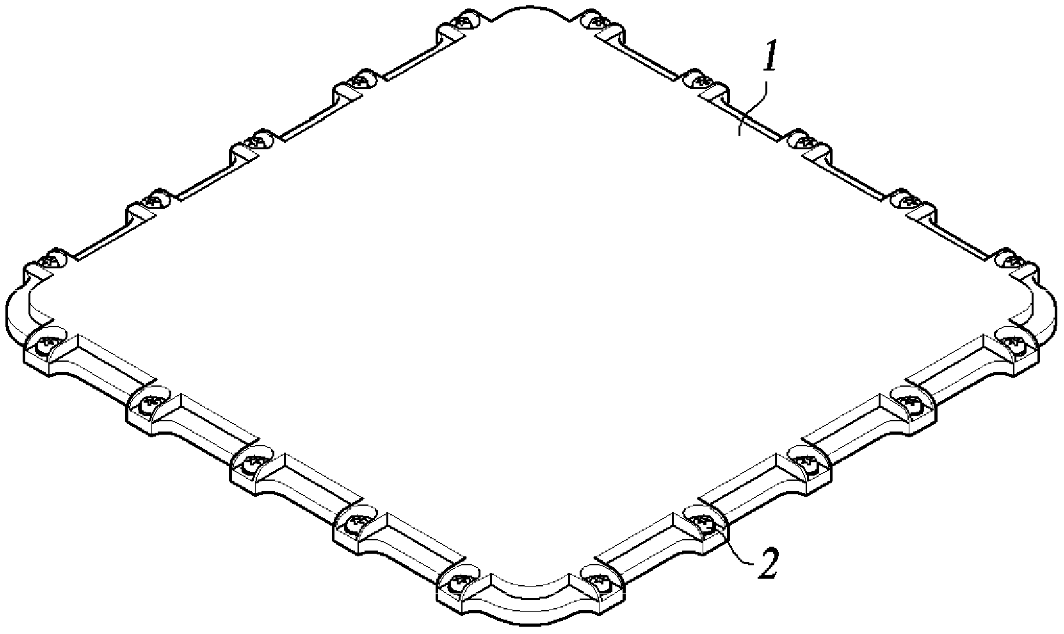
FIG. 1 is a front perspective view of a radome with conventional bolting coupling.

1: Conventional radome
2: Bolt
100, 200: Wireless communication device
110, 210, 310: Radome
120, 220, 320: First sealing ember
130, 230: Lower Case
140: Second sealing member
150, 250: Fastener

DETAILED DESCRIPTION

Accordingly, a main object of the present disclosure is to provide a wireless communication device with a simple manufacturing process.

In addition, the present disclosure has a main object to provide a wireless communication device having an excellent hermetic effect.

The problems to be solved by the present invention are not limited to the problems mentioned above, and other problems not mentioned will be apparent to those skilled in the art from the following description.

Some embodiments of the present disclosure will now be described in detail with reference to the illustrative drawings. It should be noted that, when reference numerals are added to the components in each drawing, the same components have the same numerals as possible, even if they are shown on different drawings. In the description of the present disclosure, a detailed description of a related known configuration or function is omitted when it is determined that the gist of the disclosure can be blurred.

In describing the components of the embodiments according to the present disclosure, reference numerals such as first, second, i), ii), a), and b) may be used. Such symbols are only for distinguishing the components from other components, and the nature or order of the components is not limited by the symbols. When a portion in the specification is referred to as "comprising" or "including" a component, it means that the component may further comprise other components rather than excluding other components unless explicitly stated to the contrary.

In the present disclosure, “first direction” means a vertical direction of the radome 110 when the radome is formed to be approximately elongated or a drawing direction in manufacturing the radome 110. Also, in the present disclosure, a “bending unit” refers to a unit in which the orientation of one surface and the other surface adjacent to the one surface changes, and is defined as including all of a gently curved unit or sharp corner unit. Also, in the present disclosure, “upward” and “downward” mean a direction in which the height of the lower case 130 increases and decreases. The term “side” means a region existing between the upper side and the lower side. However, the definitions of these terms are for convenience of description, and the scope of the present disclosure should not be limited by the above terms.

Meanwhile, in the description of the present invention, electrical components for communication except for the coupling structure of a wireless communication device 100 have been omitted, but it will be readily understood by those skilled in the art that the present disclosure refers to the wireless communications device 100.

Figure 2:
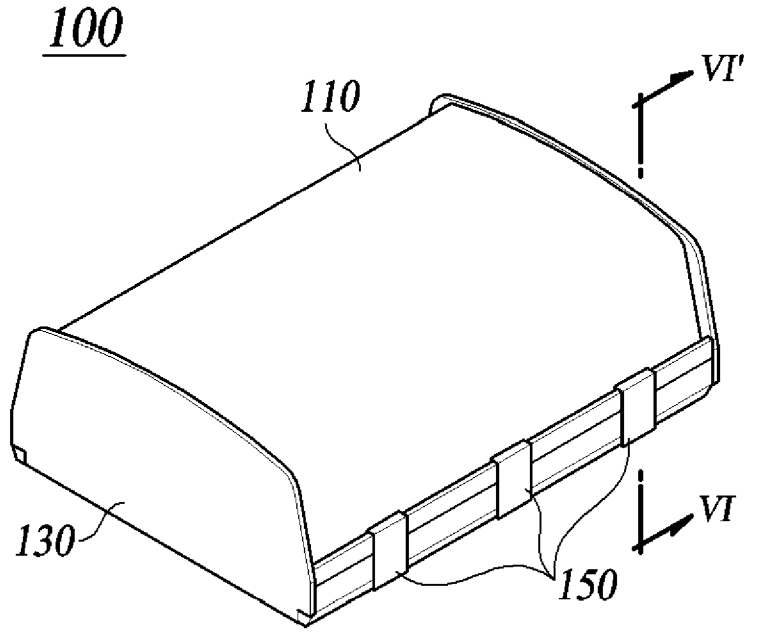
FIG. 2 is a front perspective view of a wireless communication device according to an embodiment of the present disclosure.
Figure 3:
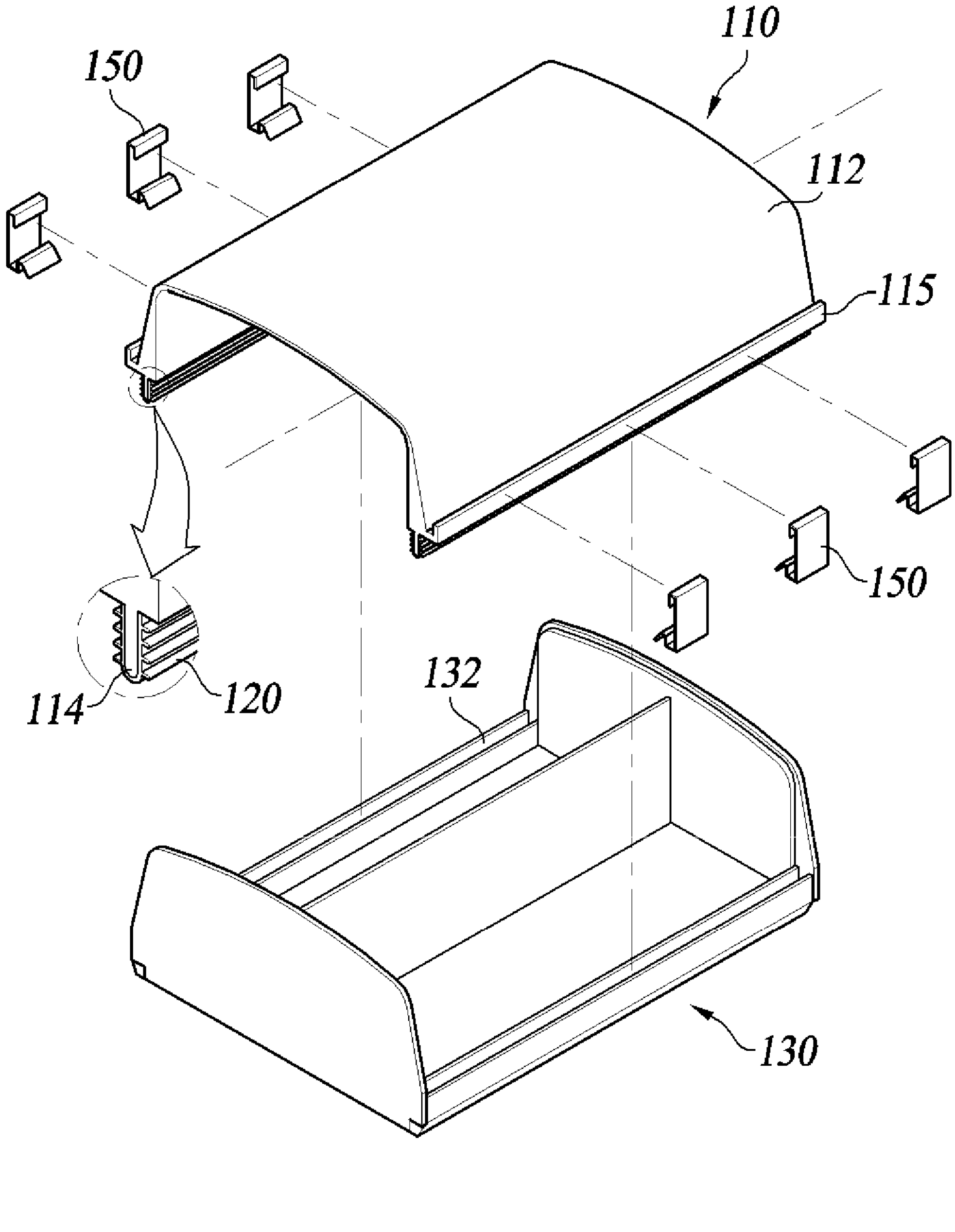
FIG. 3 is an exploded perspective view of a wireless communication device according to an embodiment of the present disclosure.

FIG. 2 is a front perspective view of a wireless communication device according to an embodiment of the present disclosure. FIG. 3 is an exploded perspective view of a wireless communication apparatus according to an embodiment of the present disclosure.

Referring to FIGS. 2 and 3, a wireless communication device 100 according to an embodiment of the present disclosure includes a radome 110, a lower case 130, and a fastener 150.

The radome 110 is disposed above the wireless communication device 100 and is configured to protect the electrical components of the wireless communication device 100 from the external environment.

The radome 110 may be manufactured by cutting in a drawing process. Specifically, a continuous draw in the form shown in FIG. 3 is obtained by the drawing process in a primitive manner. A drawn material may then be an elastically deformable material, for example a synthetic resin such as plastic. The drawn material is then cut to a predetermined length. As such, multiple radomes 110 shown in FIG. 2 can be obtained. The radome 110 according to an embodiment of the present disclosure has the advantage that the manufacturing process is then simple if only the manufacturing facility is provided. When radome 110 is manufactured through the drawing process, radome 110 may be of a configuration in which at least both ends arranged in the first direction are open.

The radome 110 includes at least one first bending unit 112, a sealing protrusion 114 and a first locking unit 115.

The first bending unit 112 is formed in a direction parallel to the first direction. At least one end of the radome 110 is directed downward by the first bending unit 112. On the other hand, although the radome 110 according to the present embodiment is shown to include a pair of first bending units 112 parallel to the first direction, the present disclosure is not necessarily limited thereto, and may include only one first bending unit 112.

The sealing protrusion 114 is configured to be inserted into a sealing protrusion groove 132 formed in the lower case 130. The sealing protrusion 114 may prevent external substances, such as water or moisture, from entering the wireless communication device 100. The sealing structure will be described in detail in FIGS. 4 and 5.

The first locking unit 115 is disposed at one end of the radome 110 and extends at least partially along the first direction. The first locking unit 115 is configured to couple in an coupling manner with at least a portion of the fastener 150. According to the present embodiment, the first locking unit 155 is formed to protrude toward the outside of the wireless communication device 100, but the present invention is not limited thereto, and may be formed to face the inside of the wireless communication device 100. In this case, the first locking unit 115 may be formed between the inner wall and the outer wall of the radome 110.

The lower case 130 is configured to couple the radome 110 to form a closed storage space therein. For example, if one or more sides of the radome 110 are open, the lower case 130 may include at least one side wall that is complementarily coupled with the open side of the radome 110.

A substrate (not shown) for communication, an antenna module (not shown), and the like may be disposed in the storage space formed by the coupling of the lower case 130 with the radome 110. The lower case 130 may be made of a metal material, but is not necessarily limited thereto.

The lower case 130 includes a sealing protrusion groove 132. The sealing protrusion groove 132 is configured to accommodate at least a portion of the sealing protrusion 114. The sealing protrusion groove 132 is formed along at least one side end of the lower case 130. When the lower case 130 and the radome 110 are coupled to each other, the coupling region is disposed close to the end of the sealing protrusion groove 132 so that the inner storage space is not obstructed. Therefore, there is an advantage that the spatial efficiency is high.

During the assembly process of the radome 110 and the lower case 130, when the sealing protrusions 114 are inserted into the sealing protrusion grooves 132, the radomes 110 may be appropriately guided. In addition, there is an advantage that the assembling process of the radome 110 and the lower case 130 is simple since it is not necessary to align the bolting holes as in the case where the bolting is required.

The fastener 150 may be configured approximately in the form of a clip. The fastener 150 includes a radome side locking unit 152 (see FIG. 4) formed on one side to couple the radome 110 side, and a case side locking unit 154 (see FIG. 3) formed on the other side to engaging the lower case 130.

The fastener 150 is coupled with at least a portion of each of the radome 110 and the lower case 130 when the radome 110 and the lower case 130 are coupled. Thus, a greater securing force may be provided for coupling of the radome 110 and the lower case 130.

In addition, the operator can easily assemble the wireless communication device 100 by fitting the fastener 150, improving the assembling property.

The wireless communication device 100 may further include a first sealing member 120.

The first sealing member 120 may be disposed between the sealing protrusion 114 and the sealing protrusion groove 132 when the sealing protrusions 114 are inserted into the sealing protrusion grooves 132.

The first sealing member 120 is configured to be in close contact with at least a portion of the sealing protrusion 114 to surround at least the portion of the sealing protrusion 114. Thus, the inner surface of the first sealing member 120 has a shape corresponding to the outer surface of the sealing protrusion 114.

The first sealing member 120 is at least partially formed of a soft material. For example, silicon. However, the present disclosure is not necessarily limited thereto, and other soft materials such as rubber and the like may be used.

Figure 4:
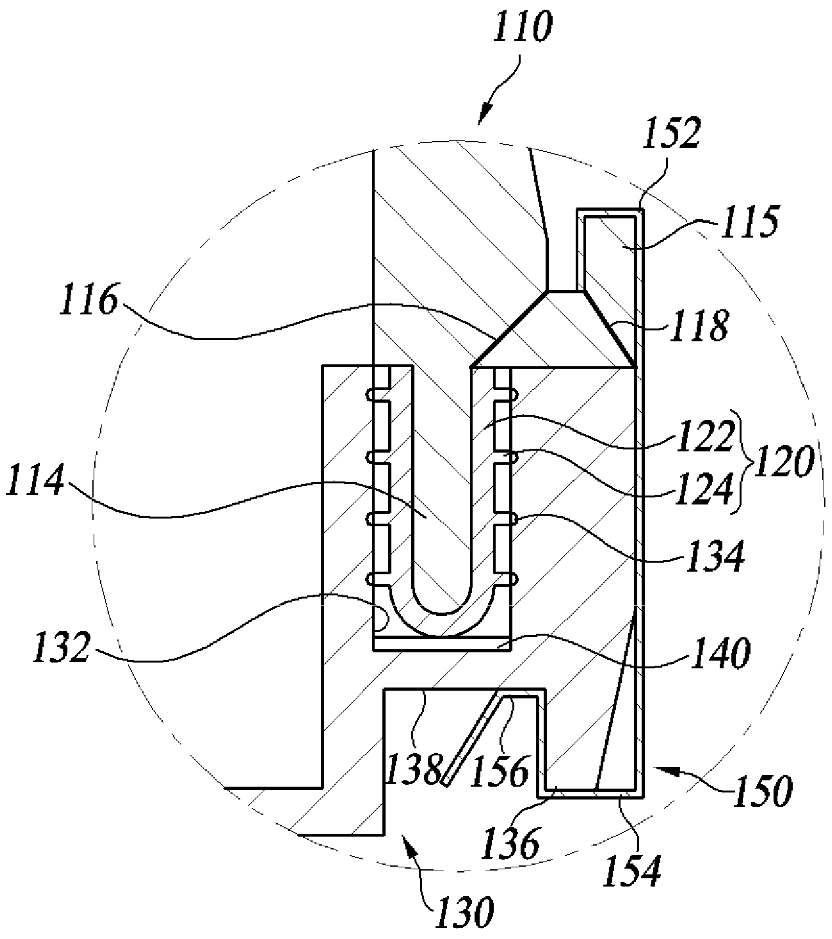
FIG. 4 is an enlarged cross-sectional view of a state in which a wireless communication device according to an embodiment of the present disclosure is vertically cut along IV-IV'.

FIG. 4 is an enlarged cross-sectional view illustrating a state in which a wireless communication device according to an embodiment of the present disclosure is vertically cut along IV-IV'.

Referring to FIG. 4, the coupling structure of the radome 110, the lower case 130, and the fastener 150 will be described in detail.

The radome 110 may include a second bending unit 116 and a third bending unit 118.

The second bending unit 116 is disposed between the first bending unit 112 and the first locking unit 115. Due to the second bending unit 116, a portion of the radome 110 may protrude outside, specifically horizontally, of the wireless communication device 100 at an end of one side wall of the radome 110.

The third bending unit 118 is disposed between the second bending unit 116 and the first locking unit 115. Due to the third bending unit 118, the protruding one end of the radome 110 may protrude upward. A groove may further be formed between the second bending unit 116 and the third bending unit 118.

The lower case 130 may include a second locking unit 136 and a fastener groove 138.

The second locking unit 136 is disposed at an end of the lower case 130, and at least a portion of the second locking unit 136 extends along the first direction. The first locking unit 115 is configured to be coupled with the case side locking unit 154 in an engaged manner. According to the present embodiment, the second locking unit 136 is formed to protrude toward the outside of the wireless communication device 100, but the present invention is not limited thereto, and may be configured to face the inside of the wireless communication device 100. In this case, the second locking unit 136 may be formed between the inner wall and the outer wall of the lower case 130.

The fastener groove 138 is formed on at least one surface of the lower case 130 adjacent to the second locking unit 136, and at least a portion of the fastener groove 138 extends along the first direction.

The fastener 150 includes a radome side locking unit 152 and a case side locking unit 154.

The radome side locking unit 152 is configured to face at least a portion of one surface of the first locking unit 115. The radome side locking unit 152 has at least one bending unit. In the case where the radome side locking unit 152 includes two or more bending units, one end of the radome side locking unit 152 may be disposed in a groove formed between the second bending unit 116 and the third bending unit 118.

The case side locking unit 154 is configured to face at least a portion of one surface of the second locking unit 136. The case side locking unit 154 has one or more bending units. In a case where the case side locking unit 154 includes two or more bending units, one end of the case side locking units 154 can be accommodated in the fastener groove 138.

Since the radome side locking unit 152 and the case side locking unit 154 include two or more bending units, even if a horizontal force to release the coupling is applied to the fastener 150, the radome side locking unit 152 can be fixed without departing from the first locking unit 115.

The fastener 150 may further include a bending region 156.

The bending region 156 may be formed at an end of at least one of the radome side locking unit 152 or the case side locking unit 154. If the wireless communication device 100 needs to be disassembled, the fastener 150 must be removed from the radome 110 and the lower case 130. At this time, when the one surface formed between the bending region 156 and the end portion of the fastener 150 is pressed, one surface in contact with the radome 110 or the lower case 130 may be separated from the contact surface. Thus, the operator can easily remove the fastener 150.

Figure 5:
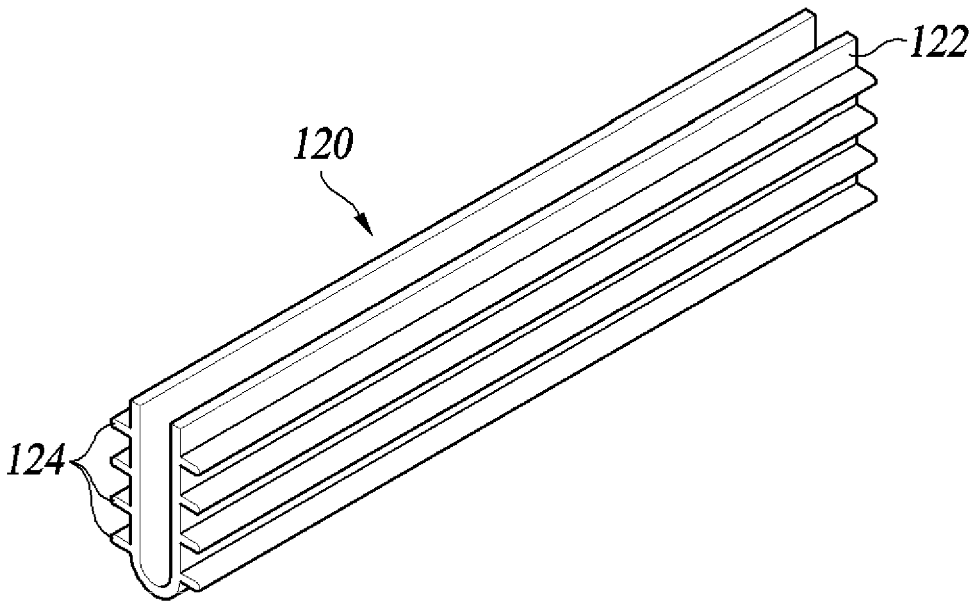
FIG. 5 is a front perspective view of a first sealing member according to an embodiment of the present disclosure.

FIG. 5 is a front perspective view of a first sealing member according to an embodiment of the present disclosure.

Referring to FIGS. 4 and 5, a sealing structure of the wireless communication device 100 according to an embodiment of the present disclosure will be described in detail.

Referring to FIGS. 4 and 5, the first sealing member 120 may include a sealing body 122 and one or more sealing pins 124.

The sealing body 122 is configured to come into close contact with the sealing protrusion 114 and surround at least a portion of the sealing protrusion 114. The sealing body 122 extends in the extending direction of the sealing protrusion 114.

The sealing pin 124 protrudes from at least one surface of the sealing body 122 toward one side of the sealing protrusion groove 132. Meanwhile, the first sealing member 120 may further include one or more sealing pins 124 protruding from the other surface of the sealing body 122 toward the other side of the sealing protrusion groove 132. At least a portion of the sealing pin 124 extends in a direction in which the sealing body 122 extends, i.e. in a direction parallel to the first direction.

The first sealing member 120 may include a plurality of sealing pins 124. In this case, the plurality of sealing pins 124 may be arranged side by side at a distance along the height direction of the sealing body 122.

There may be play between the sealing protrusion 114 and the sealing protrusion groove 132 for design reasons. In this case, there is a risk that external foreign substances, such as water or moisture, may be introduced through such play. At this time, since the sealing pin 124 extends along the extending direction of the sealing protrusion 114, it is possible to prevent foreign substance from entering from the outside. On the other hand, when the plurality of sealing pins 124 are arranged in a laminated structure, the water-proof or the dust-proof effect is increased.

The lower case 130 may further include a sealing pin groove 134 for receiving the sealing pin 124. The sealing pin groove 134 is formed on at least one side of the sealing protrusion groove 132 so as to correspond to the shape and position of the sealing pin 124. Accordingly, the sealing effect can be increased. Furthermore, the sealing pin 124 forms a locking structure with the sealing pin groove 134 to increase the contact area between the sealing pin 124 and the sealing pin groove 134. Accordingly, the frictional force between the first sealing member 120 and the sealing protrusion groove 132 can be increased. Therefore, the fastening force between the radome 110 and the lower case 130 can be further improved.

Further, the wireless communication device 100 may further include a second sealing member 140.

The second sealing member 140 may be disposed between the sealing protrusion 114 and the sealing protrusion groove 132 when the sealing protrusion 114 is inserted into the sealing protrusion groove 132. On the other hand, when the sealing protrusion 114 is tightly coupled with the first sealing member 120, the second sealing member 140 may be disposed between the first sealing member 120 and the sealing protrusion groove 132.

The second sealing member 140 may be applied to at least one surface of the sealing protrusion groove 132 before the sealing protrusion 114 is inserted into the sealing protrusion groove 132.

Figure 6:
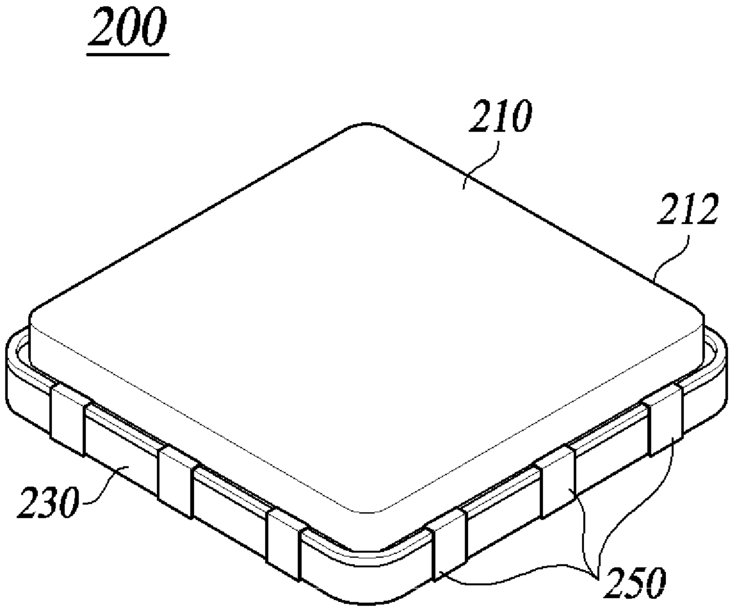
FIG. 6 is a front perspective view of a wireless communication device according to another embodiment of the present disclosure.
Figure 7:
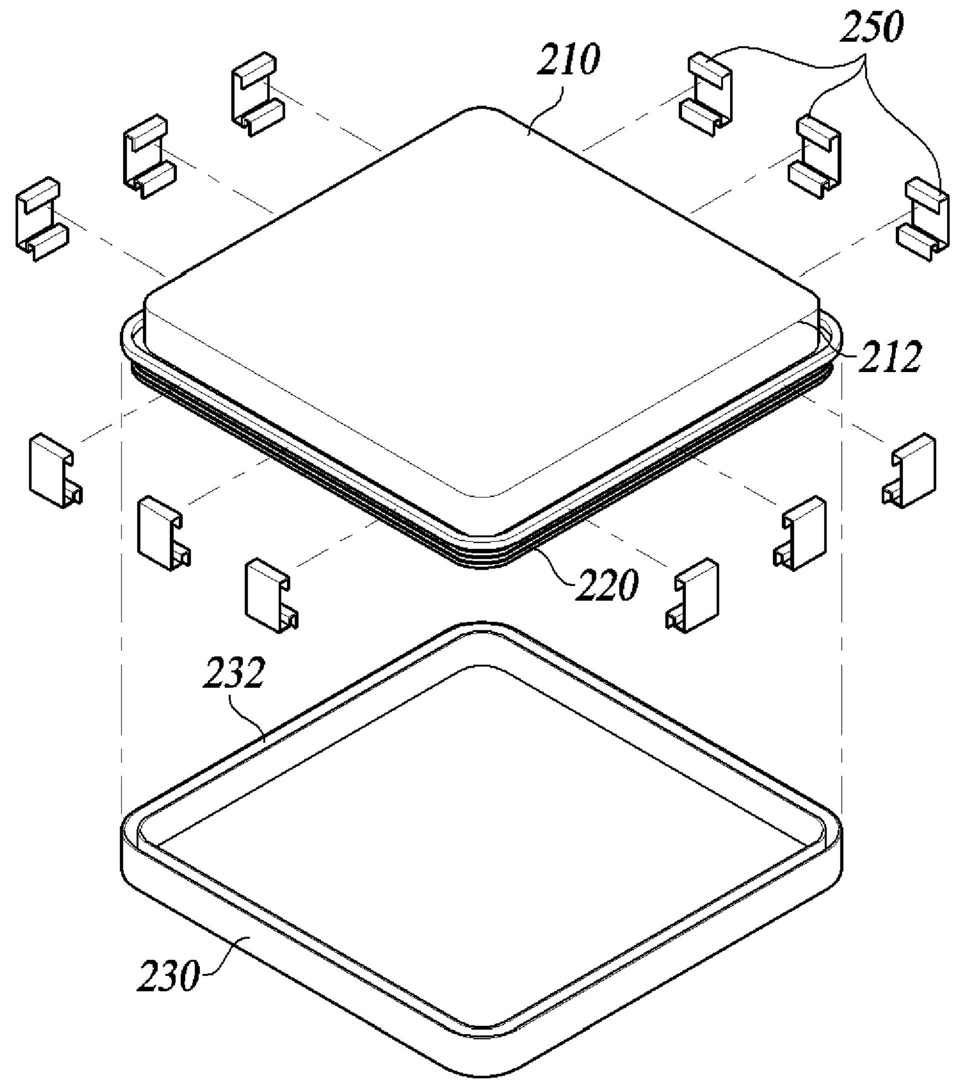
FIG. 7 is an exploded perspective view of a wireless communication device according to another embodiment of the present disclosure.

FIG. 6 is a front perspective view of a wireless communication device according to another embodiment of the present disclosure. FIG. 7 is an exploded perspective view of a wireless communication device according to another embodiment of the present disclosure.

Referring to FIGS. 6 and 7, a wireless communication device 200 according to another embodiment of the present disclosure may include two or more pairs of first bending units 212 and a first sealing member 220 formed along an end of each sidewall.

The other pair of first bending units 212 may be further disposed between the pair of the first bending units 212 formed in the direction parallel to the first direction. Accordingly, four side walls may be formed that are configured with their ends facing downwards.

At the ends of the four side walls, a sealing protrusion (not shown) may be formed along the longitudinal direction of each end.

The lower case 230 includes a sealing protrusion groove 232 into which the sealing protrusion can be inserted.

The first sealing member 220 may be formed to surround at least a portion of an end of each sidewall. In this case, the first sealing member 220 may be configured to be approximately annular.

The fastener 250 is engaged with at least a portion of each of the radome 210 and the lower case 230 in a state where the radome 110 and the upper case 230 are coupled. Thus, a greater securing force may be provided for coupling of the radome 210 and the lower case 230.

Figure 8:
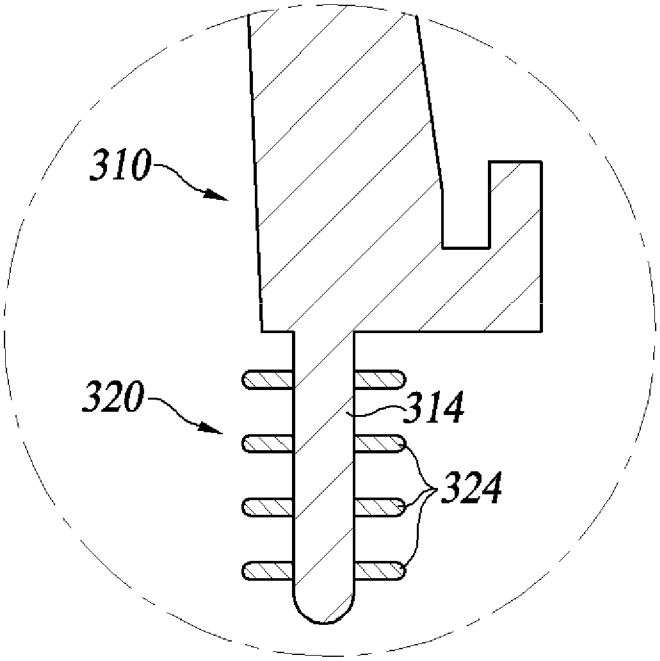
FIG. 8 is an enlarged cross-sectional view of an upper housing according to another embodiment of the present disclosure.

FIG. 8 is an enlarged cross-sectional view of the upper housing according to another embodiment of the present disclosure.

Referring to FIG. 8, a sealing pin 324 may be attached to one surface of a sealing protrusion 314 according to another embodiment of the present disclosure. That is, the first sealing member 320 does not include a sealing body.

At least a portion of the sealing pin 324 extends in parallel with the extending direction of the sealing protrusion 314, and the plurality of sealing pins 324 may be spaced apart along the height direction of the sealing protrusion 314. In this case, the sealing protrusions 314 and the sealing pins 324 may be manufactured in a double injection, but are not necessarily limited thereto.

The foregoing description is merely illustrative of the teachings of the present embodiments, and various modifications and changes may be made without departing from the essential characteristics of the embodiments by those skilled in the art. Therefore, the present embodiments are not intended to limit the technical idea of the present embodiment, but are intended to be described, and the scope of the technical concept of this embodiment is not limited by this embodiment. The scope of protection of the present embodiment is to be interpreted by the following claims, and all technical ideas that fall within the equivalent scope thereof should be interpreted as included in the scope of the invention.

What is claimed is:

1. A wireless communication device, comprising:

a radome comprising a first locking unit and a sealing protrusion formed along at least one side end of the radome;

a lower case comprising a second locking unit and a sealing protrusion groove formed along at least one side end of the lower case and configured to accommodate at least a portion of the sealing protrusion; and a fastener fastened to the first locking unit and the second locking unit to fix the lower case and the radome; and a first sealing member disposed between the sealing protrusion and the sealing protrusion groove when the sealing protrusion and the sealing protrusion groove are coupled, wherein the first sealing member comprises:

a sealing body configured to be in close contact with at least a portion of the sealing protrusion to surround at least the portion of the sealing protrusion, and extended along one side of the radome.

2. The device of claim 1, wherein the radome comprises:

one or more first bending unit formed in a direction parallel to a first direction;

a second bending unit disposed between the first bending unit and the first locking unit; and a third bending unit disposed between the second bending unit and the first locking unit.

3. The device of claim 1, wherein the fastener comprises:

a radome side locking unit formed to couple at least a portion of one side of the fastener with the first locking unit.

4. The device of claim 1, wherein the lower case comprises:

a fastener groove formed to accommodate at least a portion of the fastener on one surface of the fastener groove.

5. The device of claim 4, wherein the fastener comprises:

a case side locking unit formed to couple at least a portion of the other side of the case side locking unit with the second locking unit.

6. The device of claim 1, wherein the first sealing member comprises:

one or more sealing pins protruding from one surface of the sealing body toward the sealing protrusion groove and extending in an extending direction of the sealing body.

7. The device of claim 6, wherein a sealing pin groove configured to accommodate the one or more sealing pins is formed on at least one surface of the sealing protrusion groove.

8. The device of claim 1, wherein the first sealing member is made of a soft material.

9. The device of claim 1, wherein the radome is obtained by a drawing process in a direction parallel to a first direction.

10. The device of claim 9, wherein the radome comprises: a pair of first bending units parallel to the first direction.

11. The device of claim 1, further comprising:

one or more sealing protrusion protruding from one surface of the sealing protrusion toward the sealing protrusion groove.

12. A wireless communication device, comprising:

a radome comprising a first locking unit and a sealing protrusion formed along at least one side end of the radome;

a lower case comprising a second locking unit and a sealing protrusion groove formed along at least one side end of the lower case and configured to accommodate at least a portion of the sealing protrusion;

a fastener fastened to the first locking unit and the second locking unit to fix the lower case and the radome; and a second sealing member disposed between the sealing protrusion and the sealing protrusion groove when the sealing protrusions and the sealing protrusion grooves are engaged, wherein the second sealing member is applied to at least one surface of the sealing protrusion groove.

13. A wireless communication device, comprising:

a radome comprising a first locking unit and a sealing protrusion formed along at least one side end of the radome;

a lower case comprising a second locking unit and a sealing protrusion groove formed along at least one side end of the lower case and configured to accommodate at least a portion of the sealing protrusion;

a fastener fastened to the first locking unit and the second locking unit to fix the lower case and the radome, wherein the radome comprises: a pair of first bending units disposed between a pair of first bending units parallel to the first direction and another pair of first bending units.

* * * * *